United States Patent [19]

Kumagai et al.

[11] 4,009,441
[45] Feb. 22, 1977

[54] MULTI-BAND TELEVISION TUNING APPARATUS

[75] Inventors: Tadashi Kumagai, Soma; Shoji Ogasawara, Tokyo, both of Japan

[73] Assignee: Alps Electric Co., Ltd., Tokyo, Japan

[22] Filed: Mar. 31, 1975

[21] Appl. No.: 563,735

[30] Foreign Application Priority Data

Mar. 30, 1974 Japan .............................. 49-35844

[52] U.S. Cl. ...................... 325/430; 178/DIG. 13; 325/461
[51] Int. Cl.² ........................................ H04B 1/16
[58] Field of Search ............... 325/458–465, 325/468, 308, 430–432, 435; 178/DIG. 13

[56] References Cited
UNITED STATES PATENTS

| 2,873,360 | 2/1959 | Lyman | 325/461 |
| 3,839,678 | 10/1974 | Bell | 325/468 |
| 3,931,578 | 1/1976 | Gittinger | 325/459 |
| 3,942,122 | 3/1976 | Nakanishi | 325/459 |

OTHER PUBLICATIONS

"Details of The New R.C.A. Cable Receivers" — Bruce Anderson—Oct. 1973 pp. 18–22 of Electronic Servicing—Oct. 1973 edition.

Primary Examiner—Benedict V. Safourek
Assistant Examiner—Marc E. Bookbinder
Attorney, Agent, or Firm—Guy W. Shoup

[57] ABSTRACT

A VHF mixer serves as an amplifier-mixer for VHF and an IF amplifier for UHF and CATV. UHF and CATV tuners produce the UHF and CATV IF signals respectively. A band selector switch enables a VHF local oscillator and disables UHF and CATV local oscillators to receive VHF, enables the UHF local oscillator and disables the VHF and CATV local oscillators to receive UHF and enables the CATV local oscillator and disables the VHF and UHF local oscillators to receive CATV.

6 Claims, 3 Drawing Figures

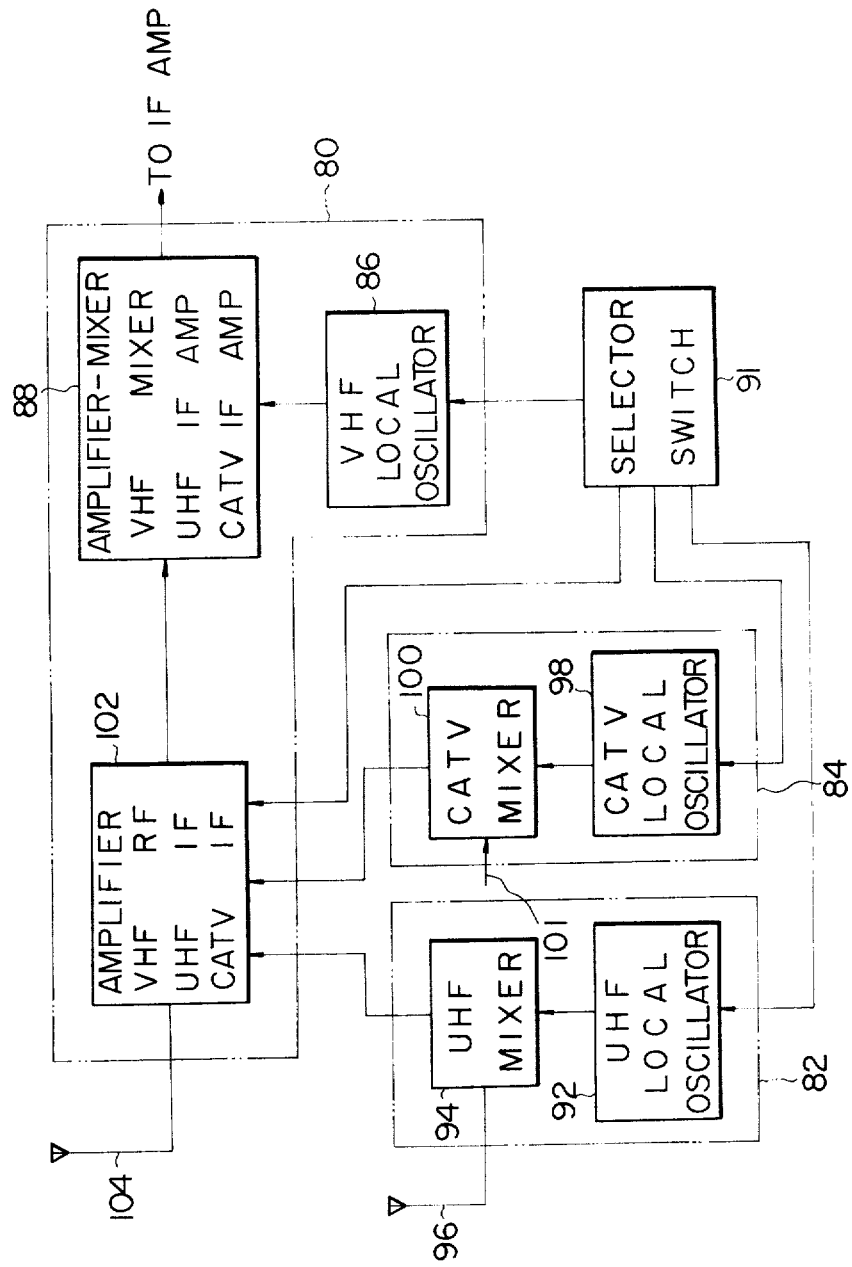

MULTI-BAND TELEVISION TUNING APPARATUS

The present invention relates to a multi-band television tuning apparatus to receive very-high frequency (VHF), ultra-high frequency (UHF) and cable (CATV) television signals.

Presently available television receivers are constructed to receive VHF and UHF television signals. In some areas, it is impossible, due to geographical limitations, to receive VHF or UHF signals using commercially available home antennas. In other areas it is possible to receive only one or two channels. For this reason cable television systems have been devised whereas a large master antenna collects VHF and UHF signals from various distant stations and feeds the signals through cables to individual television sets. In one system, incoming VHF and UHF signals are converted to the VHF channel frequencies regardless of their original frequencies. This system is advantageous in that CATV converters are not required for the individual home television sets but disadvantageous in that only 12 channels can be provided.

Another cable television system which is especially advantageous in urban areas where a large number of channels is available converts the incoming VHF and UHF signals into a special cable television (CATV) band which may have as many as 30 channels. A converter is provided for each television set to selectively convert the CATV channels to a single VHF channel such as channel 5. This system has a disadvantage in that CATV converters must be manufactured and rented or sold to CATV subscribers. These converters are expensive, and result in high rental or purchase costs. Another disadvantage of these converters is distortion of the television signals due to the inherent construction of the converters. The CATV band is much wider than the VHF band, and high noise levels result from a first hetrodyne conversion from a CATV channel to VHF channel 5 and a second hetrodyne conversion from channel 5 to the VHF IF frequency in the VHF tuner.

It is therefore an object of the present invention to provide a multi-band television tuning apparatus which is capable of receiving VHF, UHF and CATV signals.

It is another object of the present invention to provide a television tuning apparatus capable of receiving CATV signals with low distortion.

The above and other objects, features and advantages of the present invention will become clear from the following detailed description taken with the accompanying drawings, in which:

FIG. 3 is similar to FIG. 2 but shows another embodiment of the present invention.

Figure 1:
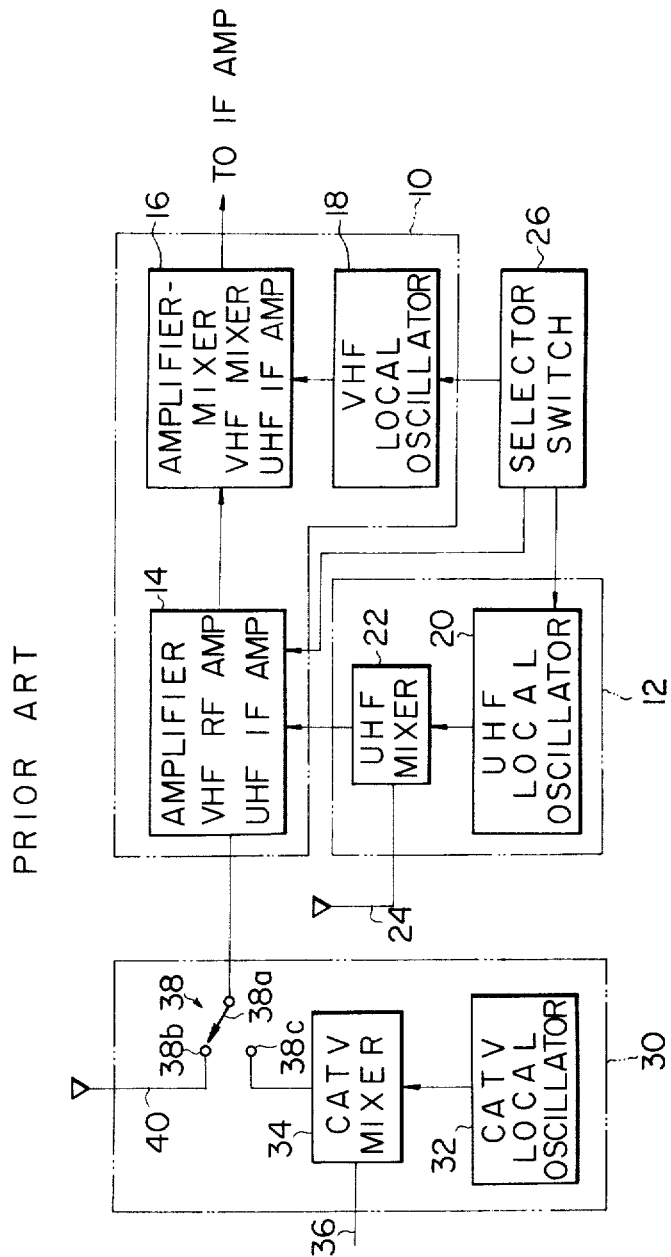
FIG. 1 is an electrical block diagram of a prior art tuning apparatus for receiving VHF, UHF and CATV signals employing a CATV converter.

Referring now to FIG. 1, in prior art tuning apparatus comprises a VHF tuner 10 and a UHF tuner 12 which constitute integral parts of a television receiver (not shown). The VHF tuner 10 includes a tuned amplifier 14, the output of which is connected to an amplifier-mixer 16. The output of a VHF local oscillator 18 is also connected to the VHF mixer 16.

The UHF tuner 12 includes a UHF local oscillator 20, the output of which is connected to an input of a UHF mixer 22. A UHF antenna 24 is connected to another input of the UHF mixer 22, the output of which is connected to a UHF IF input (no numeral) of the amplifier 14. A band selector switch 26 is connected to control the VHF local oscillator 18, UHF local oscillator 20 and amplifier 14 as will be described in detail below.

A cable television (CATV) converter 30 is provided by the cable television company and is not an integral part of the television receiver. The CATV converter 30 comprises a CATV local oscillator 32, the output of which is connected to an input of a CATV mixer 34. A cable 36 leading to a cable television station (not shown) is connected to another input of the CATV mixer 34. The CATV converter 30 also comprises a switch 38 having a movable contact 38a connected to the input of the amplifier 14. The movable contact 38a of the switch 38 is selectively engagable a fixed contact 38b connected to a VHF antenna 40 and a fixed contact 38c connected to the output of the CATV mixer 34.

To receive VHF, the television operator must actuate the switch 38 so that the movable contact 38a engages with the fixed contact 38b connecting the VHF antenna 40 to the input of the amplifier 14. The switch 38 may also comprise contacts (not shown) to disable the CATV local oscillator 32 when the movable contact 38a engages with the fixed contact 38b. The television operator must also switch the band selector switch 26 to a VHF television position. The band selector switch 26, which is integral with a channel selector switch (not shown), enables the VHF local oscillator 18 and disables the UHF local oscillator 20 so that the UHF mixer 22 produces no output. The band selector switch 26 also switches the various tuning elements (not shown) in the amplifier 14 to the VHF RF range. The VHF RF signals are fed from the antenna 40 into the amplifier 14, from which a selected VHF RF channel signal is fed into the mixer 16. The VHF RF signal is combined with the signal from the VHF local oscillator 18 in the mixer 16 to produce a VHF IF signal in accordance with the well known hetrodyne principle. The VHF IF output signal is fed from the mixer 16 to an IF amplifier (not shown).

To receive UHF, the switch 38 is in the same position as for VHF with the movable contact 38a engaged with the fixed contact 38b. The selector switch 26 is moved to a UHF position to disable the VHF local oscillator 18 and enable the UHF local oscillator 20. The switch 26 further switches the tuning elements in the amplifier 14 to the UHF IF range. The UHF RF channel signals are fed from the UHF antenna 24 into the UHF mixer 22 and combined with the UHF local oscillator signal from the UHF local oscillator 20 to produce a UHF IF output signal which is fed into the amplifier 14. The amplifier 14 amplifies the UHF IF signal and feeds it to the amplifier-mixer 16 which further amplifies the UHF IF signal and feeds it to the IF amplifier (not shown).

To receive CATV, the television operator must actuate the switch 38 so that the movable contact 38a engages with the fixed contact 38c connecting the output of the CATV mixer 34 to the input of the amplifier 14. The television operator must also switch the switch 26 to VHF channel 5, enabling the VHF local oscillator 18, disabling the UHF local oscillator 20 and switching the tuning elements in the amplifier 14 to the VHF tuning range, specifically to resonate at the channel 5 frequency. The frequency of the VHF local oscillator 18 is equal to the channel 5 frequency plus the VHF IF frequency in a well known manner.

The tuning elements (not shown) in the CATV tuner 30 are manipulated by the television operator to select the desired CATV channel so that the combination of the selected CATV RF channel signal with the CATV local oscillator signal from the CATV local oscillator 32 in the CATV mixer 34 produces an output signal at the channel 5 frequency which is fed from the CATV mixer 34 through the switch 38 to the amplifier 14. The output signal from the CATV mixer 34 is fed through the VHF tuner 10 as if it were a VHF channel 5 signal from the VHF antenna 40.

Figure 2:
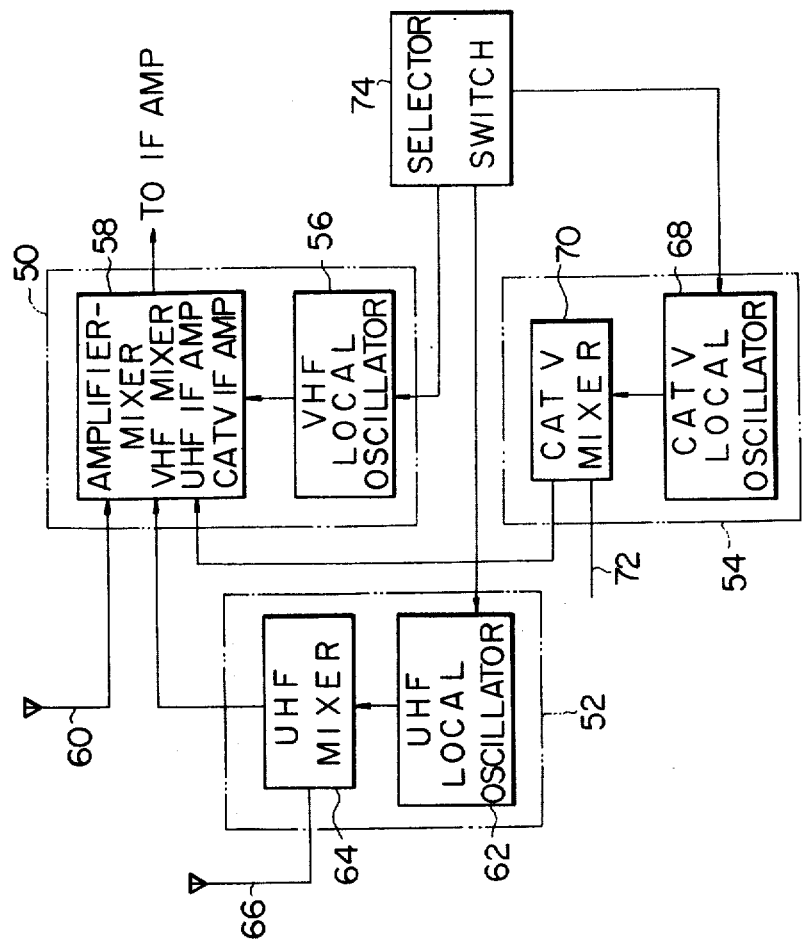
FIG. 2 is an electrical block diagram of a first embodiment of a tuning apparatus according to the present invention for receiving VHF, UHF and CATV signals.

A preferred embodiment of television tuning apparatus according to the present invention is shown in FIG. 2, and comprises a VHF tuner 50, a UHF tuner 52 and a CATV tuner 54. The detailed circuit configuration of the tuners 50, 52 and 54 is not the subject matter of the present invention, and they may operate according to any known arrangement such as turret or barrel switch tuning, push button slug tuning or electronic tuning utilizing variable capacitance diodes.

The VHF tuner 50 comprises a VHF local oscillator 56, the output of which is connected to a VHF amplifier-mixer 58, the amplification factor of which is preferably greater than unity. A VHF antenna 60 is connected to the VHF RF input of the mixer 58. The VHF IF output of the VHF mixer 58 is connected to an IF amplifier (not shown) of the television receiver.

The UHF tuner 52 comprises a UHF local oscillator 62, the output of which is connected to a UHF mixer 64. A UHF antenna 66 is connected to another input of the UHF mixer 64. A UHF IF output of the mixer 64 is connected to UHF IF input (no numeral) of the mixer 58.

The CATV tuner 54 comprises a CATV local oscillator 68, the output of which is connected to a CATV mixer 70. A cable 72 leading to a cable television station is connected to another input of the CATV mixer 70, the CATV IF output of which is connected to a CATV IF input (no numeral) of the mixer 58. The VHF, UHF and CATV IF signals have the same frequency.

A band selector switch 74 is connected to control the VHF local oscillator 56, the UHF local oscillator 62 and the CATV local oscillator 68 as will be described below. The band selector switch 74 is preferably integral with a channel selector switch which is not part of the present invention and is not shown. The CATV tuner 54 may, if desired, be adapted to perform more than one hetrodyne conversion within the scope of the invention although such a system is not illustrated. Such a multiple conversion would be for the purpose of further reducing the noise level, and may comprise a first hetrodyne conversion of a CATV signal to a frequency well above the VHF range (especially high above the channel 5 frequency) and a second hetrodyne conversion to the CATV IF frequency.

To receive VHF, the band selector switch 74 is moved to a VHF position to enable the VHF local oscillator 56 and disable the UHF local oscillator 62 and CATV local oscillator 68. The VHF RF signal from the VHF antenna 60 is amplified and combined with the VHF local oscillator signal from the VHF local oscillator 56 in the mixer 58 to produce a VHF IF signal in accordance with the hetrodyne principle which is fed to the IF amplifier (not shown).

To receive UHF, the selector switch 74 is moved to a UHF position to enable the UHF local oscillator 62 and disable the VHF local oscillator 56 and the CATV local oscillator 68. The UHF RF signal from the UHF antenna 66 is combined with the UHF local oscillator signal from the UHF local oscillator 62 according to the hetrodyne principle to produce a UHF IF signal which is fed to the mixer 58. In the case, the mixer 58 serves only as an amplifier and amplifies the UHF IF signal and feeds it to the IF amplifier.

To receive CATV, the television operator switches the selector switch 74 to a CATV position to enable the CATV local oscillator 68 and disable the VHF local oscillator 56 and UHF local oscillator 62. The cable television RF signal from the cable 72 is combined with the CATV local oscillator signal from the CATV local oscillator 68 in the CATV mixer 70 to produce a CATV IF signal which is fed to the mixer 58. The mixer 58 amplifies the CATV IF signal and feeds it to the IF amplifier.

FIG. 3 shows a second preferred embodiment of the present invention which is similar in construction and operation to the first embodiment shown in FIG. 2.

This preferred embodiment comprises a VHF tuner 80, a UHF tuner 82 and a CATV tuner 84.

The VHF tuner 80 comprises a VHF local oscillator 86, the output of which is connected to a VHF amplifier-mixer 88, the amplification factor of which is preferably greater than unity. The VHF IF output of the VHF mixer 88 is connected to an IF amplifier (not shown) of the television receiver.

The UHF tuner 82 comprises a UHF local oscillator 92, the output of which is connected to a UHF mixer 94. A UHF antenna 96 is connected to another input of the UHF mixer 94.

The CATV tuner 84 comprises a CATV local oscillator 98, the output of which is connected to a CATV mixer 100. A cable television cable 101 is connected to another input of the CATV mixer 100. The VHF, UHF and CATV IF signals have the same frequency.

A band selector switch 91 is connected to control the VHF local oscillator 86, the UHF local oscillator 92 and the CATV local oscillator 98.

The VHF tuner 80 further comprises a tuned amplifier 102, an input of which is connected to a VHF antenna 104. The output of the amplifier 102 is connected to the input of the mixer 88. The amplification factor of the amplifier 102 is greater than unity. The UHF IF output of the UHF mixer 94 is connected to the amplifier 102. The CATV IF output of the CATV mixer 100 is also connected to the amplifier 102. The selector switch 91 is also connected to control the amplifier 102 will be described below.

To receive VHF, the selector switch 91 is moved by the television operator to a VHF position to enable the VHF local oscillator 86 and disable the UHF local oscillator 92 and CATV local oscillator 98. The selector switch 91 also switches the tuning elements (not shown) of the tuned amplifier 102 to the VHF RF range, specifically to the frequency of the desired VHF channel. The selected VHF RF signal from the VHF antenna 104 is amplified by the amplifier 102 and fed into the VHF mixer 88 in which it is combined with the VHF local oscillator signal from the VHF local oscillator 86 to produce a VHF IF signal according to the hetrodyne principle which is fed to the IF amplifier (not shown).

To receive UHF, the selector switch 91 is moved to a UHF position to enable the UHF local oscillator 92 and disable the VHF local oscillator 86 and CATV local oscillator 98. The UHF RF signal from the UHF antenna 96 is combined with the UHF local oscillator signal from the UHF local oscillator 92 in the UHF mixer 94 to produce a UHF IF signal which is fed to the amplifier 102. The selector switch 91, in the UHF position, is connected to switch the tuning elements (not shown) in the amplifier 102 to resonate at the UHF IF frequency. The amplifier 102 amplifies the UHF IF signal and feeds it to the mixer 88. The VHF mixer 88 amplifies the UHF IF signal further and feeds it to the IF amplifier.

To receive CATV, the selector switch 91 is moved to a CATV position to enable the CATV local oscillator 98 and disable the VHF local oscillator 86 and the UHF local oscillator 92. The selector switch 91, in the CATV position, also switches the tuning elements in the amplifier 102 to resonate at the CATV IF frequency. The CATV RF signal from the cable 101 is combined with the CATV local oscillator signal from the CATV local oscillator 98 in the CATV mixer 100 to produce a CATV IF signal according to the hetrodyne principle. The CATV IF signal is amplified by the amplifier 102 and mixer 88 in the same manner as the UHF IF signal and fed to the IF amplifier.

The band and channel selection switches for the VHF, UHF and CATV tuners may be manufactured integrally and at low cost offering high convenience. Switching between bands in such an arrangement requires manipulating only one switch rather than several as in the prior art arrangement shown in FIG. 1. The CATV tuner, constituting an integral part of the television tuning apparatus of the television receiver, is much cheaper to manufacture than a separate CATV converter arranged to convert the CATV channels to a VHF channel, and provides a much higher signal to noise ratio. The tuning apparatus provides not only high performance and convenience, but contributes to a substantial reduction of the rental charges which cable television subscribers must pay to cable television companies which quickly makes up for the increased cost of providing the CATV turner in the television receiver.

What is claimed is:

1. Multi-band television tuning apparatus comprising:
   a combined amplifier-mixer which combines a VHF mixer, a UHF IF amplifier and a CATV IF amplifier,
   a VHF local oscillator connected to said combined amplifier-mixer;
   a UHF tuner having a UHF IF signal output connected to said combined amplifier-mixer;
   a CATV tuner having a CATV IF signal output connected to said combined amplifier-mixer; and
   band selector switch means connected to perform three alternative switching functions, namely (1) enable the VHF local oscillator and disable the UHF tuner and CATV tuner to receive VHF; (2) enable the UHF tuner and disable the VHF local oscillator and CATV tuner to receive UHF; and (3) enable the CATV tuner and disable the VHF oscillator and UHF tuner to receive CATV;
   said band selector switch means comprising a single selector switch.

2. The tuning apparatus of claim 1, in which the UHF tuner comprises a UHF mixer having a UHF RF input and a UHF IF signal output and UHF local oscillator connected to the UHF mixer.

3. The tuning apparatus of claim 1, in which the CATV tuner comprises a CATV mixer having a CATV RF input and a CATV IF signal output and a CATV local oscillator connected to the CATV mixer.

4. The tuning apparatus of claim 1, further comprising an amplifier having a VHF RF input, the UHF IF output of the UHF tuner and the CATV IF output of the CATV tuner being connected to the combined amplifier-mixer through the amplifier.

5. The tuning apparatus of claim 4, in which the amplifier is tunable, the selector switch means being connected to switch the amplifier to a VHF tuning range to receive VHF, a UHF IF frequency range to receive UHF and a CATV IF frequency range to receive CATV.

6. The tuning apparatus of claim 5, in which the UHF IF tuning range is identical to the CATV IF tuning range.

* * * * *